Oct. 27, 1970　　　　J. HRDINA　　　　3,535,926
DEVICE AND PROCESS FOR THE MEASUREMENT OF FLUID
FLOW, ESPECIALLY PULSED LIQUID FLOW
Filed July 6, 1967
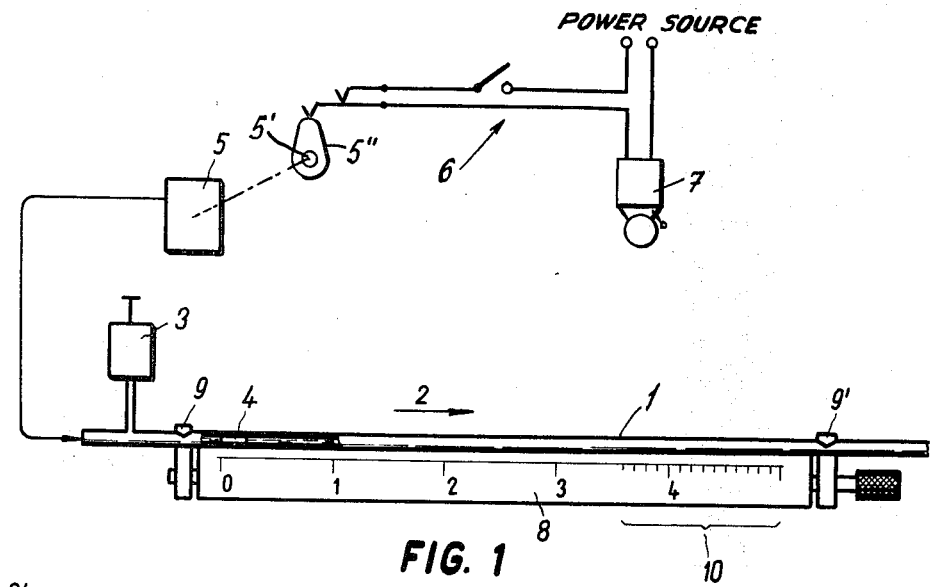
FIG. 1
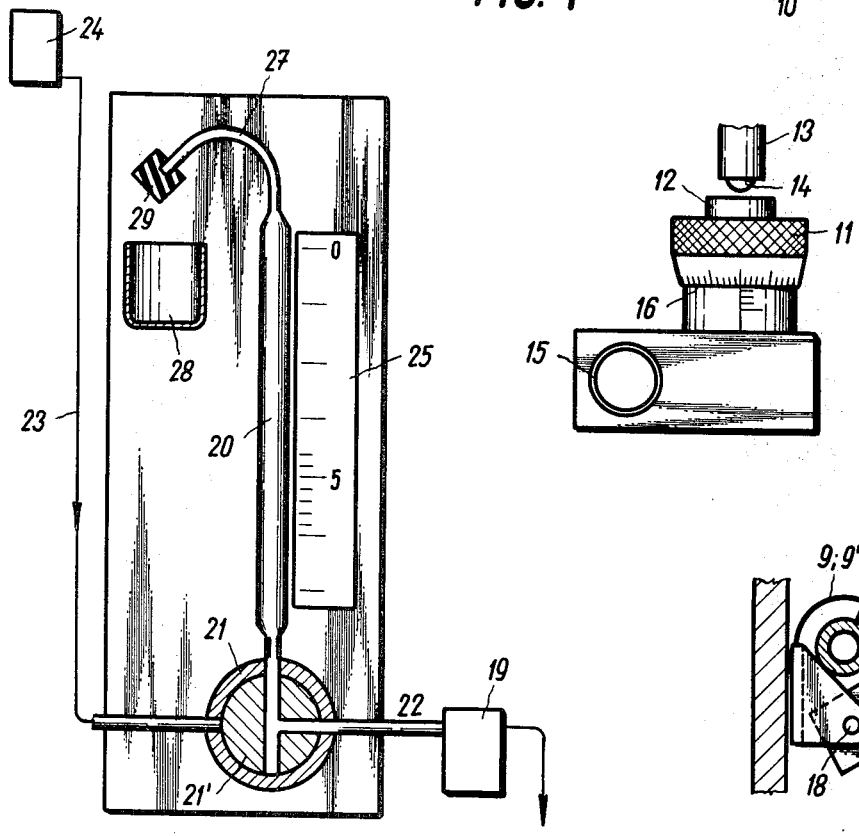
FIG. 4
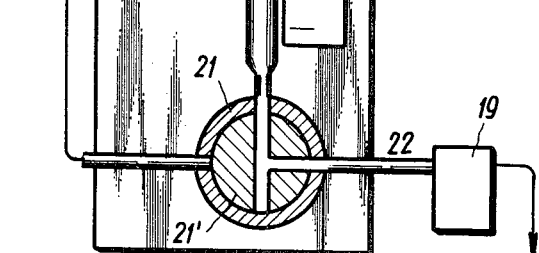
FIG. 2
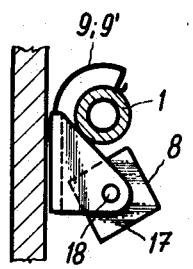
FIG. 3
INVENTOR.
JIŘÍ HRDINA
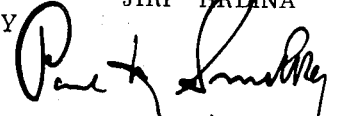
,Attorney

United States Patent Office 3,535,926
Patented Oct. 27, 1970

3,535,926
DEVICE AND PROCESS FOR THE MEASUREMENT OF FLUID FLOW, ESPECIALLY PULSED LIQUID FLOW
Jiří Hrdina, Prague, Czechoslovakia, assignor to Ceskoslovenska akademie ved, Prague, Czechoslovakia
Filed July 6, 1967, Ser. No. 651,450
Int. Cl. G01f 3/00
U.S. Cl. 73—194                                    8 Claims

ABSTRACT OF THE DISCLOSURE

In controlling fluid flow, such as pulsed liquid flow in chromatographic analysis, an apparatus is used which comprises a capillary or narrow tube through which the stream to be controlled is passed, said stream containing a series of observable spaced bubbles or other gas-liquid interfaces, and measuring the distance traveled by said gas-liquid interfaces in an interval between consecutive perceptible signals which are functionally related to the supply of fluid to the system, thereby permitting adjustment of the fluid supply to correct for deviations from a predetermined norm.

BACKGROUND OF INVENTION

In laboratory practice, particularly with automatic flow-through devices, it is often necessary to measure or exactly adjust the flow of the liquids through narrow conduits or capillaries.

The measurement is usually carried out in such a way that a bubble is let into the liquid stream and the flow rate is determined in terms of the time that elapses between the passage of one side or meniscus of the bubble through two spaced markings on the capillary through which the stream flows. However, this kind of measurement is inconvenient not only because of the necessary calculations but also because it is time consuming when the rate of flow is low. This is particularly undesirable when several different flows must be measured with the same flow meter, as for example in chromatographs for amino acid analysis, where the flow of the eluent through the column is established by means of one pump, the flow of the ninhydrin reagent is established by means of another pump, and finally the flow of the mixture of the two liquids must be determined. A still more serious reason why this known method is inadequate is that it is not suited for use in systems wherein the flow is pulsating rather than steady. In such pulsating liquid flows the simple proportional relationship between elapsed time and distance of travel in the capillary obviously does not apply.

In another known measuring method a portion of the pumped liquid is let into a vertical narrow tube or capillary by a three-way cock. After the three-way cock is turned the liquid is pumped out of the tube or capillary and the rate of movement of the meniscus in the capillary is determined under conditions similar to those in the preceding case with reference to the movement of the bubble.

Finally in the measurement of gases, instead of a bubble, one uses a film made of soap water or the like in a narrow tube. This method also has the above-mentioned shortcomings. These are eliminated by the present invention in every such case.

SUMMARY OF INVENTION

The essence of the invention resides in determining the equality or inequality of the courses or paths at the instants of like phases of the cycle, which courses are compared with the regular or programmed course by means of the ancillary element or gas-liquid interface such as a bubble, film or liquid level that moves with the controlled or measured liquid flow in the narrow passage. These paths are picked up on a comparison scale along the narrow passage, whereby the scale can be manually set so that at least one marking coincides with the position of the ancillary element in a specific phase of the cycle. Thus, advantageously, the moment of the comparison phase of the cycle is indicated by a brief, directly perceived signal, such as an acoustic one. The device is arranged in such a way that the pressure branch of the pump opens into a capillary passage that has connected to it a device for forcing in the bubbles. The pump is additionally connected by means of a line with a signal device whereby a displaceable scale is arranged along the capillary passage. The pump is provided with a regulator, e.g., a vertically positioned measuring tube is connected to the suction branch of the pump along which a displaceable scale is arranged. The lower end of the measuring tube is connected to the cock that makes possible the connection of the tube to the suction line or to the inlet line, whereby the pump is connected to a regulating device and to the signalling device.

THE DRAWINGS

FIGS. 1 to 4 are schematic representations of practical examples of the invention. FIGS. 1 to 4 represent the overall arrangement of two different embodiments and FIGS. 2 and 3 show certain details.

DETAILED DESCRIPTION OF SPECIFIC EMBODIMENTS

Referring to FIG. 1, in this apparatus the flow of liquid moving in the direction of arrow 2 in capillary 1 is measured by a method wherein a bubble 4 is forced into the stream by a pressure device or pump 3, and one of the menisci, e.g., the rear meniscus of the bubble, is followed. In this one or more fluid transporting means such as pump 5 which effects the movement of the liquid in measurig capillary 1 produces brief signals via circuit 6 by means of a device such as electric bell 7. These signals indicate certain instants which correspond to a specific phase of the working cycle. For instance, a cam 5' can be attached on the shaft of pump 5 such that as this shaft 5" revolves the cam will cause periodic closing of circuit 6 and thereby cause bell 7 to ring.

Along the straight portion of capillary 1 there is a movable scale 8 with markings from zero upward. Scale 8 is movable manually along capillary 1, e.g., it can be suspended from capillary 1 by hooks 9, 9'. When bubble 4 moves slowly a correspondence or coincidence between the 0 mark and e.g., the rear meniscus of bubble 4 can be easily established. The hand movement will then be arrested at the moment the bell 7 sounds. With a regular volume output of pump 5, further signals of bell 7 then correspond to the moments at which the position of the rear meniscus of bubble 4 reaches the succeeding marks on scale 8. After five cycles, for instance, there is thus also correspondence with the fifth mark. This is exactly true not only for a steady flow but also for a pulsating flow. In the latter case it is advantageous to adjust the signal device such that the signal occurs in that part of the cycle when the rate of motion of bubble 4 is the slowest.

If after the fifth cycle, for instance, bubble 4 reaches a position in which it has traversed a shorter course than in the normal case, this can be read off on the markings designated by numeral 10. The division between the individual marks is such that it is possible to read e.g., either the percentage of deviation from the normal state, or directly the number of marks, which indicate the extent to which the regulator for pump 5 must be adjusted, e.g., as illustrated in FIG. 2. Referring to FIG. 2, the micrometer screw 11 with its stop 12 limits here the movement of the piston connected to connecting rod 13. Connecting rod 13 with its rounded end 14 sits on stop 12 of micrometer screw 11, which stop can be turned after loosening lock nut 15. The scale markings 16 on the periphery of the knob of screw 11 can by suitable calibration correspond to changes of flow that also correspond to the marks 10 on scale 8 of FIG. 1.

The purpose of such a device is to assure that the selected side of a bubble traveling through the capillary coincides exactly with the individual marks on the measuring scale at the same instantaneous phases of the individual working cycles of the pump. When the selected side of the bubble either consistently leads or consistently trails behind the marks on the scale at the instants when the bell gives the signal, a suitable correction is made to adjust the volume output of one or more of the feed pumps such that exact coincidence is obtained between the selected edge of the bubble and each consecutive mark on the scale at the moment of each ring or other perceptible signal.

FIG. 3 shows in cross section a device similar to that of FIG. 1. Scale 8 is suspended from capillary 1 by means of hooks 9, 9'. Said scale 8 is fixed on one wall of a multisided prism 17 which is rotatable about a pin 18. By turning, any one of a plurality of scales affixed to the individual sides of prism 17 can be selected. In this way it is possible to measure in the described manner the liquid throughput on that scale which corresponds to the function of the eluent pump while the ninhydrin reagent pump is cut off; and to measure similarly and adjust on another scale the output of the ninhydrin reagent pump. On still another scale one can measure the flow of the mixture of liquids simultaneously delivered by the two pumps.

In FIG. 4 the illustrated device has a function similar to the preceding one, but the flow meter is connected to the suction side of pump 19. Here the measuring tube 20 is disposed vertically and connected by its lower end to three-way cock 21, whose core 21' has a T-shaped passage and which, depending upon its position, connects tube 20 either to suction line 22, or to input line 23. The latter is connected to an appropriately elevated supply chamber 24 which contains the required liquid. The arrangement permits connecting all three passages or cutting them off, or line 23 can be connected to line 22. The latter case corresponds to normal operation, while connecting tube 20 to input line 23 corresponds to the phase of filling the flow meter. When tube 20 is connected to suction line 22 as shown in FIG. 1, this corresponds to the period of flow measurement. Scale 25 along tube 20 with the markings that correspond to the displacement of the liquid level at the moment of the signal, makes the device of FIG. 4 similar to that of FIG. 1, insofar as the function and reading of the scale are concerned. The upper, curved end of tube 20 constitutes a safety device, whereby in case of overrunning the excess liquid is collected in vessel 28 or, instead of being thus collected, it is carried off as waste after having been collected through a funnel (not illustrated). In the interval during which measurement does take place, the end 27 of the tube can be closed off by a plug 29, particularly to prevent any undesirable disturbance of the measuring process through oxidation or drying out of the contents of tube 20 which are sucked off during measurement by pump 19 for further processing.

I claim:

1. Apparatus for measuring the rate of flow of fluid from a source emitting fluid in a series of substantially uniform cycles, said flow rate varying periodically and substantially identically during each of said cycles, said apparatus comprising a conduit, means connecting said conduit with said source of fluid, said conduit including means indicating the flow of fluid through said conduit, means for signaling the duration of each of said flow cycles, and scale means adjacent said conduit for measuring the flow distance as recorded by said indicating means during said cycle as recorded by said signal means.

2. The apparatus according to claim 1 wherein said fluid is a liquid and said indicating means includes means for introducing gas bubbles into said liquid stream adjacent said conduit, whereby the progress of said bubbles through said conduit indicates the flow distance of said liquid through said conduit.

3. The apparatus according to claim 1 wherein said conduit comprises a vertically disposed measuring tube, said fluid transporting means comprises a pump having a suction side and a valve means adapted to connect the lower end of said tube alternately to said source of supply or to said suction side of the pump.

4. The apparatus according to claim 1 wherein said scale means comprises a rotatably mounted elongated multisided bar having its axis of rotation substantially parallel to said conduit means and having different scales affixed to the various sides thereof.

5. A process for measuring the flow rate of fluid flowing through a conduit in uniformly cycles of repeating varying rates, said measuring process comprising producing a series of signals, said signals corresponding to the duration of said cycles, and measuring the distance of travel of a segment of fluid through said conduit during at least one of said cycles as measured by said signals whereby an accurate measurement of changes of flow rate can be detected.

6. The process according to claim 5 wherein said source of fluid flow includes a pump having a rotary shaft, said pump drawing in fluid on the suction side and expelling fluid on the pressure side in cyclically varying flow rates, said signal means operating in response to rotation of said pump shaft.

7. The process according to claim 6 wherein said conduit is connected with said suction side of said pump, said fluid flowing sequentially through said conduit and through said pump.

8. The process according to claim 5 wherein said fluid is a liquid and including introducing gas bubbles into said liquid upstream from said conduit, whereby the progress of said bubbles through said conduit provides an indication of said flow distance.

References Cited

UNITED STATES PATENTS 2,340,455   2/1944   Davis _____ 184—96

FOREIGN PATENTS 309,470   10/1918   Germany.
512,388   1/1955   Italy.
895,364   5/1962   Great Britain.

OTHER REFERENCES

Ehlers, K. W.: Constant-Pressure Leak-Rate Gage, Univ. of California, Berkeley, for U.S.A.E.C., September 1957.

Marsh, A. E. L.: A New Type of Flow Meter for Slow Rates of Flow, March 1940.

RICHARD C. QUEISSER, Primary Examiner

J. K. LUNSFORD, Assistant Examiner